United States Patent
Holze et al.

(10) Patent No.: US 8,701,287 B2
(45) Date of Patent: Apr. 22, 2014

(54) METHOD FOR AERODYNAMICALLY SHAPING THE LEADING EDGE OF BLISK BLADES

(75) Inventors: Liane Holze, Neu-Anspach (DE); Gregor Riedel, Buedingen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1239 days.

(21) Appl. No.: 12/385,329

(22) Filed: Apr. 6, 2009

(65) Prior Publication Data

US 2009/0249623 A1  Oct. 8, 2009

(30) Foreign Application Priority Data

Apr. 4, 2008 (DE) .................... 10 2008 017 624

(51) Int. Cl.
*B23P 15/02* (2006.01)
*B23P 15/04* (2006.01)

(52) U.S. Cl.
USPC ........... 29/889.7; 29/557; 29/558; 29/889.71; 29/889.23

(58) Field of Classification Search
USPC .............. 29/557, 558, 889.23, 889.7, 889.71
See application file for complete search history.

(56) References Cited

U.S. PATENT DOCUMENTS

| | | | |
|---|---|---|---|
| 4,001,978 A | 1/1977 | Hales et al. | |
| 4,563,801 A * | 1/1986 | Schill et al. | 29/889.4 |
| 4,596,501 A * | 6/1986 | Wu | 409/131 |
| 5,733,080 A | 3/1998 | David et al. | |
| 6,095,402 A | 8/2000 | Brownell et al. | |
| 6,491,482 B1 | 12/2002 | Fenkl et al. | |
| 6,764,384 B1 | 7/2004 | Kleer et al. | |
| 6,905,312 B2 | 6/2005 | Bourgy et al. | |
| 6,991,434 B2 | 1/2006 | Heinrich et al. | |
| 7,377,037 B2 * | 5/2008 | Ouellette et al. | 29/889.23 |
| 7,527,476 B2 | 5/2009 | Butt et al. | |
| 7,637,010 B2 * | 12/2009 | Burgess et al. | 29/889.23 |
| 2007/0039179 A1 | 2/2007 | Koehler | |
| 2007/0177979 A1 | 8/2007 | Hoeger | |
| 2007/0240307 A1 * | 10/2007 | Deron et al. | 29/889.2 |
| 2009/0249623 A1 | 10/2009 | Holze et al. | |

FOREIGN PATENT DOCUMENTS

| | | |
|---|---|---|
| CH | 661678 | 8/1987 |
| DE | 19612396 C2 | 2/1998 |
| DE | 10340520 A1 | 3/2005 |
| DE | 102004001394 A1 | 8/2005 |

(Continued)

OTHER PUBLICATIONS

European Search Report dated Jul. 1, 2009 from counterpart application.

(Continued)

*Primary Examiner* — Alexander P Taousakis
(74) *Attorney, Agent, or Firm* — Timothy J. Klima; Shuttleworth & Ingersoll, PLC

(57) ABSTRACT

For shaping the leading edge (1) of blisk blades (2), the shape, amount and disposition of the material to be removed in a subsequent grinding and polishing process is determined beforehand over the entire blade length. The blade leading edge is milled such that an elliptical profile (3) has a material allowance (7) which over the length of the leading edge exactly corresponds to an expected material removal during the grinding and polishing process, so that a blisk blade is produced whose leading edge features an aerodynamically advantageous shape.

7 Claims, 1 Drawing Sheet

(56) References Cited

FOREIGN PATENT DOCUMENTS

| | | |
|---|---|---|
| DE | 102004026386 A1 | 12/2005 |
| EP | 0 432 703 | 6/1991 |
| EP | 1459824 | 9/2004 |
| JP | 51-121813 | 10/1976 |
| JP | 2000263309 | 9/2000 |
| JP | 2003-120203 | 4/2003 |
| JP | 2003 340706 | 12/2003 |
| WO | 95/09062 | 4/1995 |
| WO | 00/29171 | 5/2000 |
| WO | WO 2005/065885 A1 | 7/2005 |

OTHER PUBLICATIONS

Japanese Office Action dated Apr. 27, 2012 from counterpart application.

Japanese Office Action dated Dec. 8, 2011 from counterpart application.

* cited by examiner

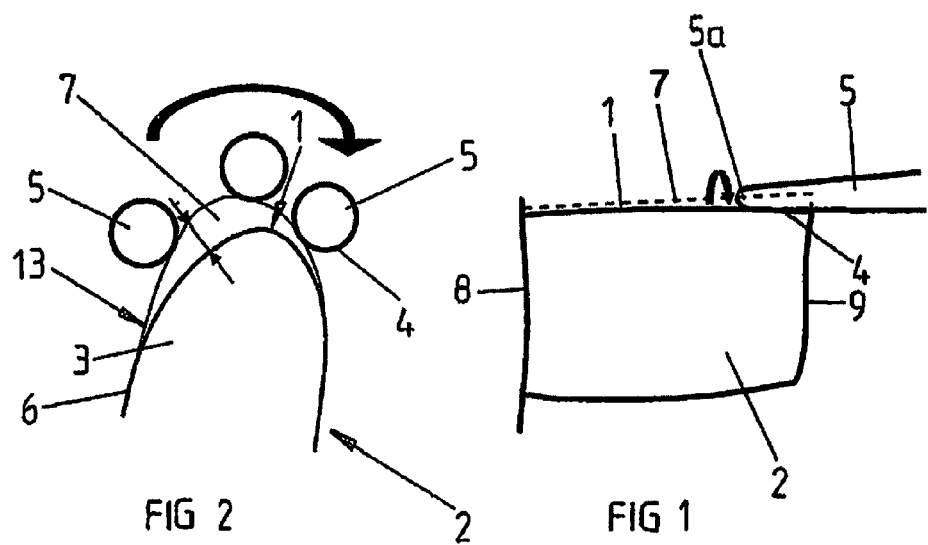
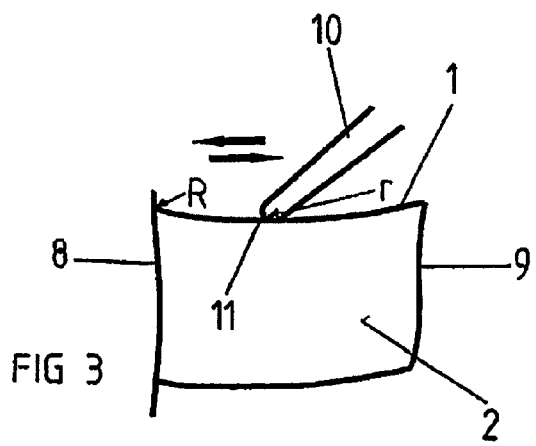
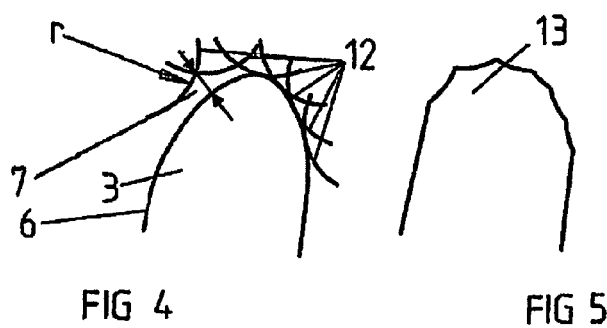

METHOD FOR AERODYNAMICALLY SHAPING THE LEADING EDGE OF BLISK BLADES

This application claims priority to German Patent Application DE102008017624.9 filed Apr. 4, 2008, the entirety of which is incorporated by reference herein.

This invention relates to a method for aerodynamically shaping the leading edge of blisk blades machined from the solid with a material allowance and subsequently treated in a grinding and polishing process.

The rotors of gas-turbine engines, as is generally known, also employ blisks, on which the rotor blades are integral with the rotor disk to form a one-piece unit. Besides reduced assembly costs, integrally bladed rotors are characterized by low weight and less centrifugal load. Integrally bladed rotors are manufactured by either joining separately manufactured blade elements with the rotor disk in a friction-welding process or milling the rotor blades from the solid material of a disk blank. When milling the rotor blades from the solid material the blisk blades, upon being pre-shaped in a rough-machining process, are finish-machined in a point-contact milling process in which the milling cutter with semi-spherical cutting head is spirally routed around the entire blade, thereby shaping the suction and pressure side as well as the leading and trailing edge of the blade. The leading edge, which is crucial for the performance of the blisk, is milled with an evenly distributed material allowance retained on it, i.e. with an excess stock retained on the leading edge after milling to take account of the stock removed during subsequent vibratory grinding. However, this method is incapable of producing a constantly aerodynamically shaped profile of the leading edge over the entire length of the blade.

The present invention, in a broad aspect, provides a method for shaping the leading edge of blisk blades machined from the solid which enables a constant, aerodynamically shaped leading-edge profile to be produced over the entire edge length.

In manufacturing blisk blades by milling from the solid and subsequent grinding and polishing, the blade leading edge is produced as an elliptical profile on which a material allowance is retained. This material allowance is, in shape and amount, retained such over the entire length of the leading edge that it exactly corresponds to the material which will be removed therefrom during grinding and polishing of the blisk blade. The shape, amount and disposition of the allowance which, after milling, is retained on the elliptical profile of the leading edge left for grinding is determined beforehand by tests and optical measuring methods. It was found that the material allowance must be asymmetrically disposed towards the suction side of the blisk blade and the amount of material allowance must increase from the annulus to the blade tip. A blisk blade with such an asymmetrical profile of the leading edge so pre-shaped will, upon grinding and polishing treatment, have an elliptical leading edge whose aerodynamically advantageous shape improves the performance of the blisk.

The asymmetrical pre-profile of the leading edge according to the present invention is produced by flank-milling around the leading edge in plane milling strips following each other over the length of the blade and being oriented in the flow direction. Flank-milling is similarly accomplished along the pressure and suction side of the blisk blade and around the trailing edge thereof.

In a further development of the present invention, the asymmetrical pre-profile can also be generated by line-wise milling the leading edge in the longitudinal direction, actually by producing several, side-by-side, concave milling paths using a spherical cutter head. The radius of the cutter head is preferably equal to or smaller than the fillet radius, enabling also the fillet of the blisk blade to be line-wise milled using the same cutting tool.

The present invention is more fully described in light of the accompanying drawings showing preferred embodiments. In the drawings, FIG. 1 is a schematic representation showing flank-milling of the leading edge of a blisk blade, FIG. 2 is an enlarged representation of an elliptical blade leading edge during flank-milling, FIG. 3 is a schematic representation showing line-wise milling in the longitudinal direction of the leading edge of a blisk blade using a die cutter with semi-spherical cutter head, FIG. 4 is a sectional view of an elliptical blade leading edge during line-wise milling as per FIG. 3, and FIG. 5 is a sectional view of the line-wise milled blade leading edge prior to subsequent grinding and polishing process.

The leading edge 1 of the blisk blade 2 shall, upon milling and polishing, feature the—aerodynamically advantageous—elliptical profile 3 shown in FIGS. 2 and 4. According to FIGS. 1 and 2, the leading edge 1 is milled using the cutting flank 4 of a shank-type cutter 5 having a rounded cutter head 5a, actually along the blade length in several milling paths following each other and extending in flow direction and around the leading edge. Milling around the leading edge 1 is accomplished such that a material allowance 7 which is asymmetrical towards the suction side 6 of the blisk blade is retained on the specified elliptical profile 3 of the leading edge 1. The material allowance 7 left upon flank-milling corresponds, in amount and disposition, to the material which, as determined beforehand in tests with optical measuring systems, will be removed during subsequent vibratory grinding and polishing of the blisk blade, so that the leading edge 1, upon subsequent grinding and polishing, will have an elliptical profile. Consistent with the material removal determined for vibratory grinding and polishing, the amount of the asymmetrical material allowance 7 steadily increases over the length of the leading edge 1, i.e. from the annulus 8 to the blade tip 9, and may be 0.1 mm in the area of maximum material allowance at the blade tip.

Line-wise milling in longitudinal direction of the leading edge 1 as shown in FIGS. 3 to 5, i.e. from the blade tip 9 to the annulus 8 or vice versa, is, in the embodiment here shown, accomplished using a die cutter 10 with semi-spherical cutter head 11. Material removal at the leading edge 1 is executed in several—in the present example six—side-by-side milling paths (lines) 12 with a radius r which preferably is equal to or smaller than the fillet radius R at the transition between the airfoil and the annulus, thus enabling also the fillet lines to be (line-wise) milled using the same cutting tool. However, the number of milling paths 12 actually depends on the tool, the blade geometry and the grinding and polishing conditions. In line-wise milling, as in the flank-milling process explained in FIGS. 1 and 2, material is removed such that a material allowance 7 is retained on the specified elliptical profile which is asymmetrical, i.e. shifted towards the suction side 6, and decreases in thickness from the blade tip 9 to the annulus 8. The material allowance 7 retained upon line-wise milling, or the asymmetrical pre-profile/leading edge profile 13 produced in the process, is, in shape and amount, consistent with the subsequent grinding and polishing process, so that, upon grinding and polishing, the leading edge 1 of the blisk blade 2 will have the specified elliptical profile 3.

List of Reference Numerals

1 Leading edge
2 Blisk blade

3 Elliptical profile
4 Cutting flank
5 Shank-type cutter
5a Rounded cutter head
6 Suction side
7 Material allowance
8 Annulus
9 Blade tip
10 Die cutter
11 Semi-spherical cutter head
12 Milling path
13 Asymmetrical pre-profile/leading edge profile
R Fillet radius
r Radius of 11, 12

What is claimed is:

1. A method for aerodynamically shaping leading edges of blisk blades, comprising:
   machining an initial shape of the leading edges from a solid, the initial shape having the form of an elliptical profile with an overlying material allowance over a length of the leading edge from a radially inner portion of the leading edge at an annulus of the blisk to a radially outer portion of the leading edge at a blade tip, a shape, amount and positioning of the overlying material allowance being determined based on material removal conditions of a subsequent grinding and polishing process; wherein an amount of the overlying material allowance steadily increases from the radially inner portion of the leading edge at the annuals of the blisk to the radially outer portion of the leading edge at the blade tip;
   subsequently subjecting the leading edges to the grinding and polishing process to remove the overlying material allowance and obtain the elliptical profile of the leading edges.

2. The method of claim 1, wherein the overlying material allowance is asymmetrically formed on the elliptical profile towards a suction side of each blisk blade, thereby producing an asymmetrical initial shape.

3. The method of claim 2, wherein the asymmetrical initial shape is produced by flank-milling around the leading edge in plane milling strips following each other over the length of the leading edge and oriented in a flow direction.

4. The method of claim 3, wherein the flank-milling is similarly performed along a pressure and a suction side and around a trailing edge of each blisk blade.

5. The method of claim 2, wherein the asymmetrical initial shape is generated by line-wise milling, producing several, side-by-side, concave milling paths in a longitudinal direction of the leading edge.

6. The method of claim 5, wherein a die cutter having a semi-spherical cutter head is used for the line-wise milling.

7. The method of claim 6, wherein a radius of the cutter head is equal to or smaller than a fillet radius of the leading edge, thereby also allowing the fillet radius to be line-wise milled using the cutter head.

\* \* \* \* \*